Sept. 12, 1933.　　　　J. R. PEIRCE　　　　1,926,882
PERFORATED CARD READING AND ANALYZING DEVICE
Filed Oct. 17, 1929　　　5 Sheets-Sheet 1

Inventor
John Royden Peirce
By his Attorney

Sept. 12, 1933.  J. R. PEIRCE  1,926,882
PERFORATED CARD READING AND ANALYZING DEVICE
Filed Oct. 17, 1929  5 Sheets-Sheet 3

Inventor
John Royden Peirce
By his Attorney

Sept. 12, 1933.  J. R. PEIRCE  1,926,882
PERFORATED CARD READING AND ANALYZING DEVICE
Filed Oct. 17, 1929  5 Sheets-Sheet 4
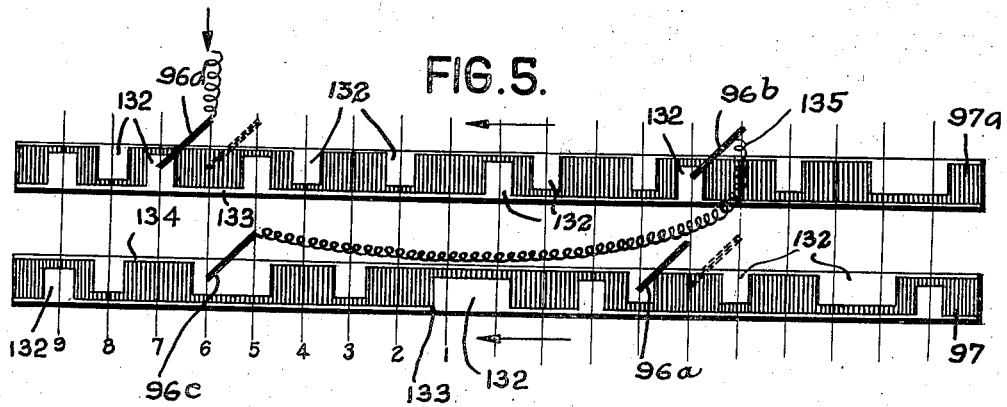
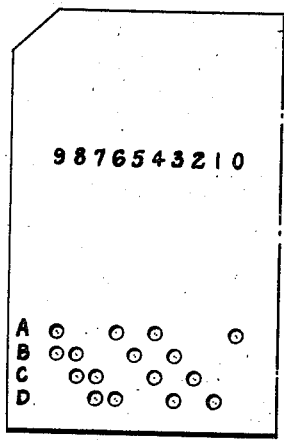
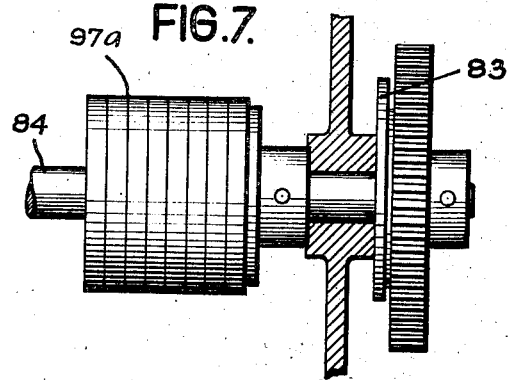
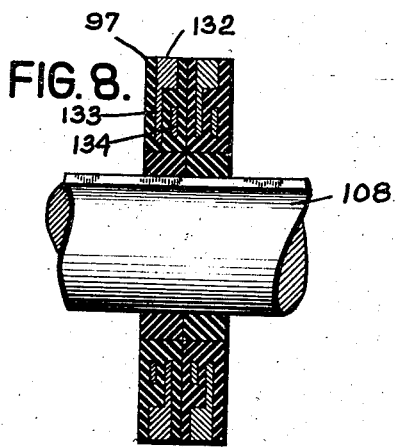
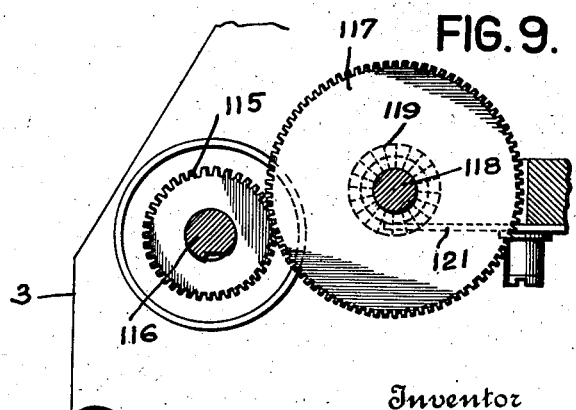
Inventor
John Royden Peirce
By his Attorney
A. C. Maby Sept. 12, 1933.                J. R. PEIRCE                 1,926,882
                PERFORATED CARD READING AND ANALYZING DEVICE
                      Filed Oct. 17, 1929       5 Sheets—Sheet 5
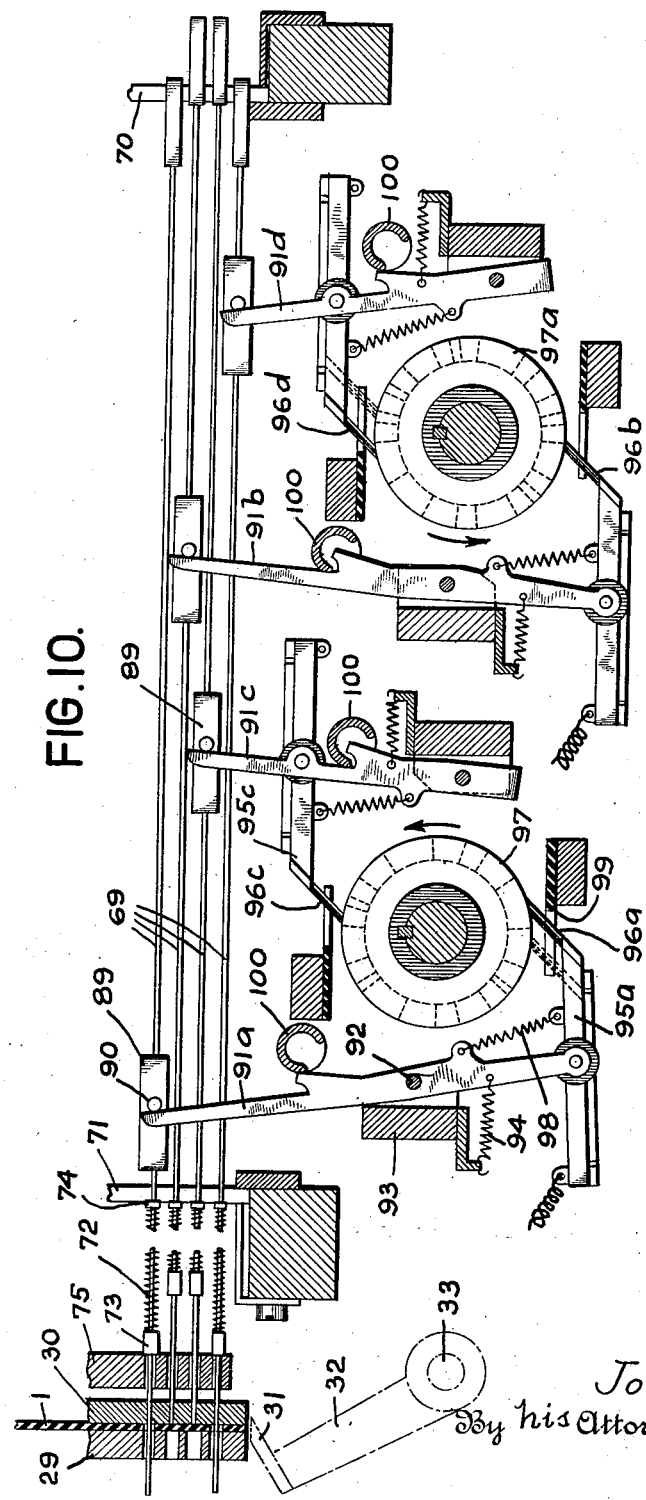
Inventor
John Royden Peirce
By his Attorney Patented Sept. 12, 1933

1,926,882

UNITED STATES PATENT OFFICE 1,926,882

PERFORATED CARD READING AND ANALYZING DEVICE

John Royden Peirce, New York, N. Y., assignor, by mesne assignments, to International Business Machines Corporation, New York, N. Y., a corporation of New York Application October 17, 1929. Serial No. 400,307

5 Claims. (Cl. 235—92)

This invention relates to analyzing devices for perforated card controlled accounting machines and more particularly to the perforation sensing devices and the mechanism controlled thereby for controlling the accumulators.

One object of the invention is to devise means whereby the perforations of the record card may be analyzed by sensing pins and the reading taken by the pins converted by electrical devices which in turn control the accumulator wheels.

Another object is to devise means whereby the perforation sensing pins will effect a setting of brushes with respect to their commutators to control the timing of the electric circuits for controlling the operation of the accumulator wheels.

Referring to the drawings:

Fig. 5 is a diagrammatic development of the commutators used in the analyzer.

Fig. 6 is a portion of a perforated record used to control the machine and showing the code or arrangement of the perforations to represent the individual digits.

Fig. 7 is a section taken on the line 7—7 of Fig. 2 showing the mounting of the commutators and the drive therefor.

Fig. 8 is a section through two of the commutator units showing the manner in which they are assembled.

Fig. 9 is a detail of an accumulator wheel and the drive therefor.

Fig. 10 is an enlarged detail, parts being shown in section, of the sensing pins, the brushes controlled thereby and the commutators with which the brushes cooperate.

Figure 3:
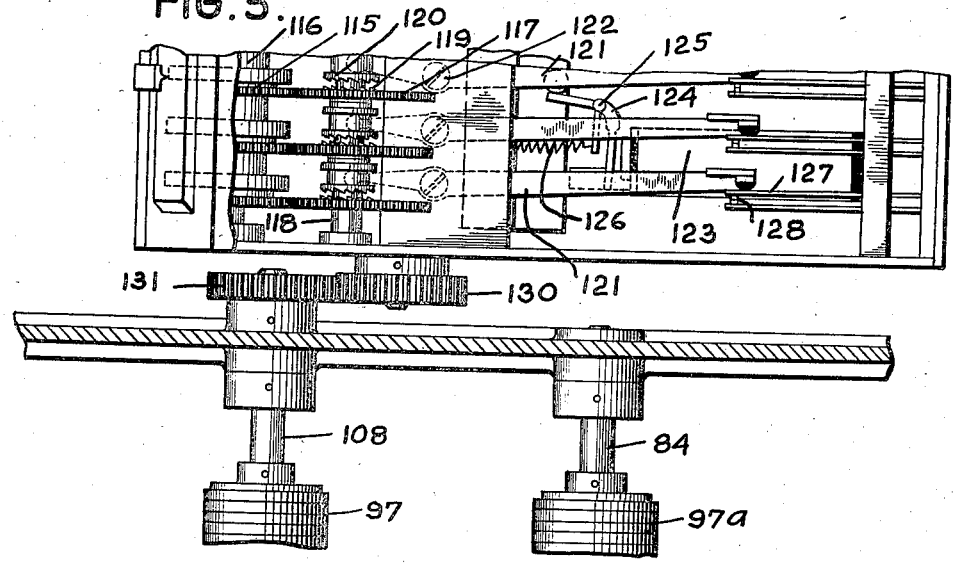
Fig. 3 is a detail of the accumulators.

In the well known Hollerith tabulators, accumulators similar to that shown in Fig. 3 are employed in which a constantly rotating shaft may be clutched to the accumulator wheels during a portion of a revolution of the shaft to turn the accumulator wheels a distance representing the value which is being added. In the Hollerith type of tabulator the control card is provided with ten hole positions to a column the values ranging from 0 up to 9. The card is fed so that the ten positions in a column pass successively under sensing brushes, the 9 passing under the brush first, followed by the 8 and then the 7, etc. The accumulator driving shaft turns synchronously with the passage of the successive hole positions of the card under the brush. If a hole appears in the 9 position, the accumulator clutch is thrown in and the accumulator commences to turn and continues to turn until the end of a card cycle after which it is de-clutched. During this cycle the accumulator wheel turns to accumulate the value "9". If a perforation appears at some other point in the column, as for instance at the 5 position, the clutching takes place at a correspondingly later time in the cycle and continues to the end of the cycle, adding 5 to the accumulator wheel before the de-clutching takes place.

In the present invention I use the same type of accumulator, operating synchronously with commutators which in turn control electric circuits to energize the accumulator control magnets at different times during the cycle of operation depending upon the amount to be added to the accumulator wheel. The time in the cycle when a circuit will be established through the commutators to the accumulator control magnets, depends upon the position of the brushes with respect to the commutators which in turn is controlled by the sensing pins. Instead of using ten hole positions in a column to represent a digit, I use but four positions and instead of reading the card while it is moving past the brushes, I stop it in the sensing position and project the pins against the card to sense the perforations therein. One or more perforations in the four positions are used to represent any given digit in accordance with the well known Peirce combinational hole system.

Figure 1:
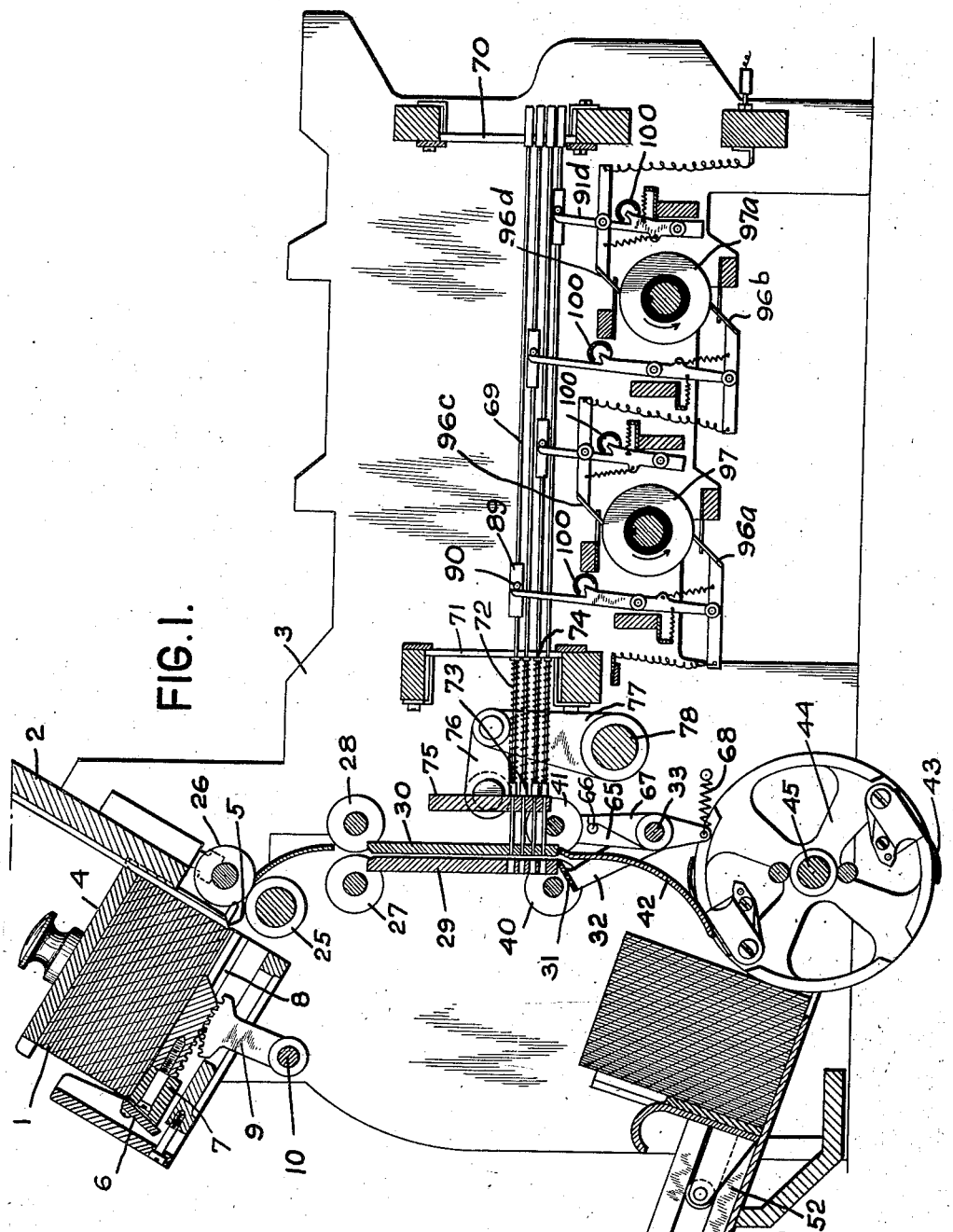
Fig. 1 is a side elevation partly in section of an analyzing unit adapted to be applied to tabulating machines of the well known Hollerith type.

In Fig. 1 the perforated cards 1 are shown stacked in a hopper 2 mounted between the supporting plates 3. A weight 4 presses the cards down in the hopper. A narrow slot 5 at the bottom of the hopper is adapted to permit but one card to pass through at a time. The card picker 6 is adapted to grip the lowermost card of the stack and advance it through the slot 5. The picker is mounted on sliding member 7 carried in the grooves 8 in the frame of the machine. The supporting member 7 is provided with rack teeth meshing with a segmental gear 9 mounted on a shaft 10 and adapted to oscillate to move the picker back and forth. The shaft 10 has fixed thereon outside of the supporting plates 3 an arm 11 connected by a link 12 to a bell crank 13 pivoted at 14 and provided with a cam follower roll 15 cooperating with the cam 16 fixed on shaft 17. A spring 18 connected to an arm 19 also on shaft 10 serves to hold the follower 15 against its cam and to move the picker forward to feed the card through the slot 5. In other words, the spring 18 pulls the arm 19 downwardly, causing it to rock shaft 10 clockwise as viewed in Fig. 2. Referring to Fig. 1, it will be seen that the clockwise rocking of shaft 10 causes the segmental gear 9 to also rock clockwise or in other words toward the right and this in turn will cause the supporting member 7 with the card picker 6 to move forward or toward the right, thus causing the lowermost card to be fed through the slot 5 to the feed rollers 25, 26. The shaft 17 has fixed thereon a gear 20 meshing with a gear 21 which in turn meshes with gear 22. Gear 22 meshes with gear 23 which is driven by the driving gear 24.

Figure 2:
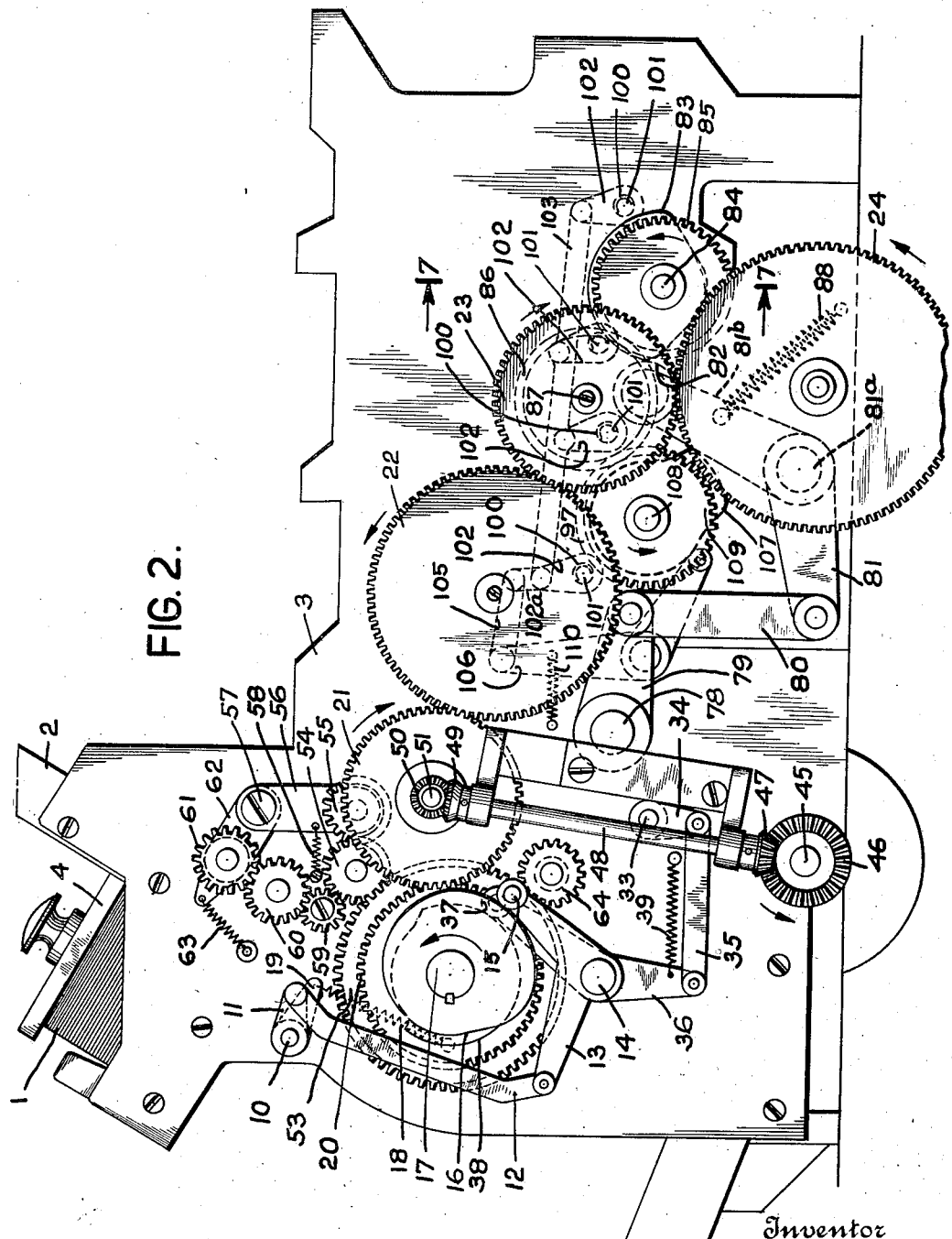
Fig. 2 is a side view of the device shown in Fig. 1 with the side plate in position and showing the driving mechanisms on the outside of the plate.

One complete cycle of the shaft 17 causes the card picker to move once to the right to feed a card through the slot 5 and back to the left as in Fig. 1. When the card is fed through the slot 5 it is gripped between feed rollers 25, 26 and fed by these rollers to the next set of feed rollers 27, 28 which in turn feed it between the plates 29, 30. The card is fed downwardly until it is stopped by a gate 31 mounted on an arm 32 pivoted at 33. Fixed on shaft 33 as shown in Fig. 2 is an arm 34 connected by link 35 to a cam follower arm 36 having a cam follower roller 37 cooperating with a cam 38 on the shaft 17. A spring 39 holds the follower against its cam. The cam 38 is adapted to cause the gate 31 to move to the position of Fig. 10 to stop the card between plates 29, 30 and to rock counterclockwise to permit the card to pass out from between the plates 29, 30 later in the cycle. At this time the feed rollers 40, 41 will feed the card out from between the plates 29, 30. A curved guide plate 42 will guide the leading edge of the card into cooperation with the clips 43 on the card stacker 44 pivoted at 45. This stacker is well known in the art and need not be described in detail. The stacker is actuated by a bevel pinion 46 on shaft 45 and meshing with a bevel pinion 47 fixed on shaft 48. Another bevel pinion 49 on shaft 48 meshes with bevel pinion 50 fixed on shaft 51 with the gear 21. The timing of the stacker is such that the clips 43 are open to receive the card as it feeds downwardly over the guide plate 42. The clips then grip the card and pull it into the discharge stack or pocket 52.

The turning of the feed rollers is effected by a gear 53 mounted on shaft 17 and meshing with a pinion 54 fixed with respect to the feed roller 27. The pinion 54 meshes with pinion 55 fixed with respect to the roller 28 which is carried on an arm 56 pivoted at 57 and held resiliently against the card by a spring 58. An idler 59 meshes with pinion 54 and pinion 60 fixed with respect to the feed roller 25. Pinion 60 meshes with pinion 61 fixed with respect to the feed roller 26 which is carried on the arm 62 pivoted at 57 and held resiliently by spring 63 against the card.

The lower feed roller 40 is provided with a pinion 64 meshing with the gear 53. The roller 41 is not positively driven but is driven by being pressed against the card and in turn pressing the card against the roller 40 which is positively driven. Roller 41 is carried on an arm 65 loose on the shaft 33 and provided with a pin 66 which is engaged by an arm 67 fixed on shaft 33. Spring 68 attached to the arm 65 tends to rock the roller 41 against the card or the roller 40 lightly. When the shaft 33 rocks to move the gate 31 to permit the card to be fed out the arm 67 engages the arm 65 and presses the roller 41 firmly against the card to insure feeding thereof. After the card 1 has been fed to the position of Fig. 10 and stopped by the gate 31 the sensing pins 69 of which there are four for each column of data on the card, are permitted to advance against the card. The sensing pins are supported at their forward ends in the plate 30, and at their rear ends in plate 70 and also by an intermediate plate 71. Each pin 69 is provided with a spring 72 resting at one end against a collar 73 fixed to the pin and at the other end against a collar 74 loose on the pin and resting against the plate 71. The spring 72 thus tends to press the pin against the card or through the card if there is a perforation therein at that position. A restoring plate 75 resting against the collars 73 is adapted to restore the sensing pins to non-reading position as in Fig. 1 and to be moved to the left to permit the pins to take a reading from the card. The restoring plate 75 is connected to arms 76 which are in turn connected to arms 77 fixed on shaft 78 which as shown in Fig. 2 has fixed thereon an arm 79 connected by a link 80 to an arm 81 pivoted at 81a and fixed with respect to a cam follower arm 81b provided with a cam follower roller 82 cooperating with a cam 83 fixed on shaft 84. Shaft 84 has fixed thereon a gear 85 meshing with a gear 86 on the shaft 87 on which is also mounted the gear 23. A spring 88 connected to the bell crank 81 holds the follower against the cam 83. The cam positively restores the plate 75 to the position of Fig. 1 removing the pins from reading position to the position of Fig. 1 while the spring 88 moves the plate 75 to the left to permit the pins to be actuated by their springs to take their readings.

The upper sensing pin 69 has fixed thereon a block 89 having a pin 90 adapted to engage an arm 91a pivoted at 92 on a fixed support 93. A spring 94 tends to hold the arm 91a against the pin 90. Arm 95a pivoted on the arm 91a carries a brush 96a adapted to engage a commutator 97. There is one of these brushes to each of the four sensing pins 69 of a column, it being understood that there are several such columns depending upon the width or capacity of the machine. A spring 98 presses the brush against the commutator. The brushes 96a are held properly spaced by a comb or slotted member 99. The third pin 69 counting from the top also has a block 89 cooperating with an arm 91c carrying an arm 95c and brush 96c. Brush 96c cooperates with the opposite side of the commutator 97. The second pin 69 is adapted to control an arm 91b and brush 96b while the fourth pin 69 actuates an arm 91d and a brush 96d. Brushes 96b and 96d cooperate with commutator 97a on opposite sides. When the sensing pins 69 are released to read the card those that find perforations project through as in Fig. 10 and rock their respective arms 91. In Fig. 10 the uppermost and lowermost pins 69 have passed through the card and have rocked their arms 91a, 91d and have advanced their brushes 96a, 96d along the periphery of the commutators 97, 97a from the dotted line positions to the full line positions. This shifting of the brush on the periphery of the commutator causes a circuit to be closed through the commutator and brushes at a different time in the cycle of operation of the machine to effect a different control upon the accumulators. In other words, the time of closure of a circuit through the brushes and commutators determines the value to be run into the accumulator. The shifting of the brushes in various combinations varies the time of closure of the circuit and thus varies the value which is run into the accumulator. This is more fully brought out later. The second and third pins 69 have not found perforations in the card and have been stopped by the card and have therefore not changed the positions of their brushes 96b, 96c with respect to the commutators. Associated with the arms 91 are latching members 100 pivoted at 101 as indicated in Fig. 2. Arms 102 connected to latch members 100 are all connected to link 103. One of the arms 102 has a projection 102a which is connected by link 105 to bell crank cam follower arm 106 cooperating with a cam 107 on shaft 108. A gear 109 also fixed on this shaft meshes with the gear 86 for operation. A spring 110 holds the follower against its cam. After the sensing pins 69 have taken their readings and rocked their arms 91 the cam 107 (Fig. 2) reaches a position which permits spring 110 to rock the follower 106 counter-clockwise. This will rock all of the latches 100 slightly counter-clockwise from the position of Fig. 1 to that of Fig. 10. This will hold those of the arms 91 that have moved in such moved position as shown in Fig. 10 so that the pins 69 may then be restored and the card fed from the sensing position.

Figure 4:
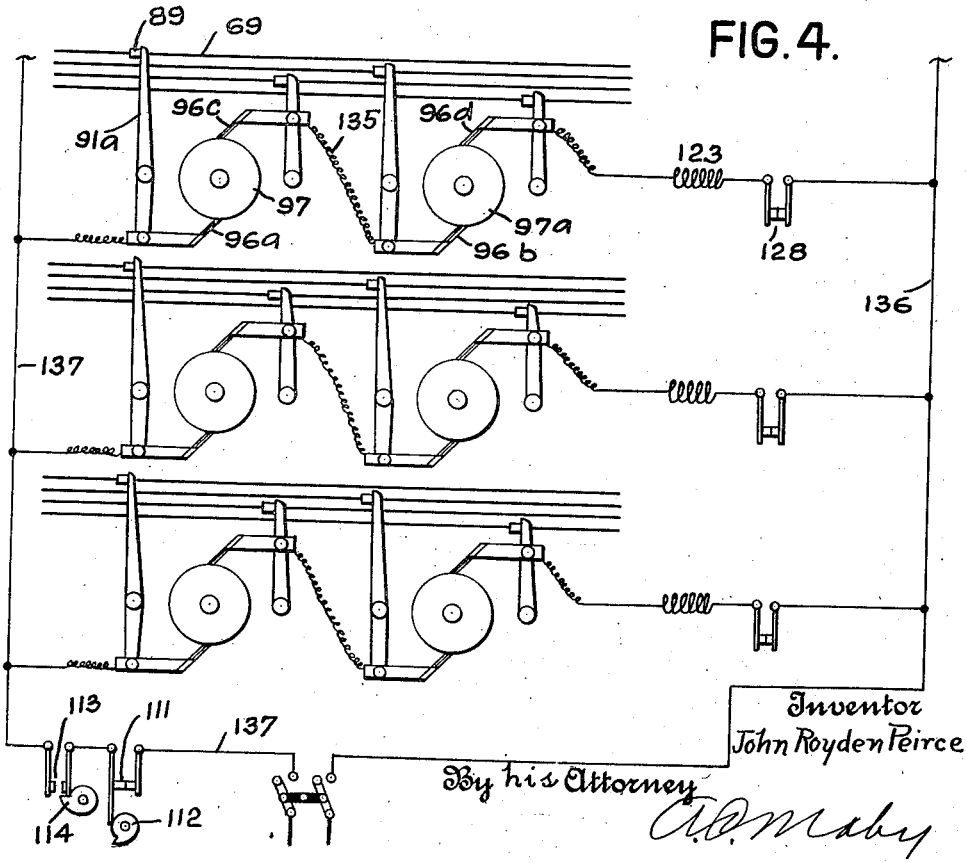
Fig. 4 is a wiring diagram of the electric circuits controlled by the sensing pins and in turn controlling the accumulator magnets.

While the arms 91 are thus latched the reading is analyzed by the rotation of commutators 97, 97a. The commutators are turning continuously but during the card feeding and analyzing portions of the cycle the contacts 111 (Fig. 4) are open. These contacts are controlled by a cam 112 which may be mounted on any of the shafts, as for instance shaft 17, which turns one revolution for each card cycle of the machine. After reading has been taken and the arms 91 set, cam 112 releases the contacts 111 and permits them to close. Another set of contacts 113 is adapted to be controlled by a cam 114 which may be mounted on the same shaft as cam 112. Contacts 113 are closed before the end of the card sensing operation so that when contacts 111 become closed current is supplied to all of the brushes operating on the commutators. The purpose of the contacts 111, 113 is to supply current to the analyzing commutators and brushes beginning at a precise point in the cycle of operation of the machine and stopping at a precise point. By employing two sets of contacts as here disclosed, it is possible to accurately time the closing of the circuit and the opening thereof. In this connection, it will be readily seen that closing of contacts 111 takes place when the leaf spring thereof drops off from the high portion of the cam to the lower portion. By adjusting the cam 112 on its shaft the point of closure can thus be regulated very precisely. This closure takes place after contacts 113 have been closed by their cam 114 where it will be seen that the cam gradually moves one of the contact leaves slowly toward the other and the time of closure is not so precise as that of contacts 111 but so long as contacts 113 are closed before contacts 111, the closure of the latter will complete the circuit at the precise time required. On the other hand, the opening of contacts 113 takes place when the leaf drops off from the high point of the cam 114 and thus can be precisely regulated by adjusting the cam on its shaft. After contacts 113 have been opened at the precise time desired and while they are still open, cam 112 will open contacts 111 so that when the contacts 113 are again closed, the circuit will be open and will then be closed by contacts 111 at the exact time necessary. This arrangement of double contacts known as make and break contacts is very common in this art. Machines of the character disclosed here are operated through successive cycles and the same series of operation is performed during each successive cycle. For instance, a machine cycle in the present case would include the time taken to feed a card from the supply hopper 2 to the card sensing position between plates 29, 30 and then from the sensing station to the discharge stack 52 below it. During these operations, the analyzing commutators 97, 97a are constantly rotating but are not performing analyzing operations. During that part of the cycle, the circuit is open through contacts 111, 113 and the commutators are turning idly. During another portion of the cycle, the circuit is closed through contacts 111, 113 and the commutators are performing their analyzing functions. Also, during a portion of the cycle, namely, after the card has reached the sensing station, and before the circuit is closed through the commutators the analyzing pins 69 take their readings from the card and adjust the brushes 96 on the commutators. The analyzing portion of the cycle corresponds to the time required for the accumulator wheels to turn one revolution. In other words, the accumulator pinions, to be described presently, are adapted to turn one complete revolution representing the accumulation of ten) during the time that it takes to perform the analyzing functions and they are adapted to be clutched to the driving mechanism during part of the analyzing operations depending upon the value to be accumulated. During this period both sets of contacts 111, 113 are closed and at the end of this period cam 114 permits contacts 113 to quickly open.

The accumulator wheels or pinions are shown at 115 (Figs. 3 and 9) and are loose on shaft 116. The accumulator pinions mesh with gears 117 loose on shaft 118 which is constantly rotating. Fixed to the gear 117 is a clutch member 119 and slidably mounted on shaft 118 but constrained to turn therewith are clutch members 120 provided with circumferential grooves engaged by clutch control arms 121 pivoted at 122. Associated with each arm 121 is a control magnet 123 having an armature 124 pivoted at 125 and actuated by a spring 126 into position over shoulder 124a of a block 124b fixed to the arm 121. Armatures 124 which serve as latches thus hold the arms 121 in position to maintain the clutch members 120 out of mesh with the clutch members 119. When the magnet 123 becomes energized rocking its armature 124, the respective arm 121 is unlatched and the spring 127 of contacts 128 rocks the arm 121 counter-clockwise about its pivot 122 and moves the clutch member 120 into cooperation with member 119 so that the gear 117 will be caused to rotate, thus turning the accumulator wheel 115.

The clutches are, of course, brought into operation at varying times during the adding portion of the cycle but are all de-meshed together at the end of the adding portion of the cycle by mechanism shown in U. S. Patent No. 1,307,740. The accumulator parts are turned by a gear 130 meshing with a gear 131 fixed on shaft 108 which as shown in Fig. 2 is turned by the gear 109 cooperating with the gear 86.

Also fixed on the shaft 108 are the commutators 150

97, one for each column of pins 69 or columns of perforations on card 1. The commutators 97a are carried on shaft 84 which is actuated by gear 85 mounted thereon and meshing with gear 86.

Fig. 5 shows a diagrammatic development of one of the commutators 97 and one of the commutators 97a. The shaded areas represent insulating material and the white areas represent conductor segments 132 and connections between the segments. For instance, all of the segments 132 on the lower edge of the commutator 97 are interconnected by a common circumferential strip 133 (see also Figure 8) while all of the segments 132 on the upper edge are interconnected by a strip 134. The commutator may be divided into a plurality of equal divisions which are commonly called points. In the present case, the commutator is divided into twenty points and it may therefore be stated that the commutator operates on a twenty point cycle. During ten of these points, the machine is performing card feeding and sensing operations and the commutator circuit is open at contacts 111, 113. During the other ten points the contacts 111, 113 are closed and the analyzing operations are performed. During any one of these latter points in the cycle the circuit may be closed depending upon the setting of the brushes 96. The laying out of the commutator including the positioning of the segments 132 is such that if the brushes are in a particular position a circuit will be closed at one point in the cycle of operation and with a different setting of the brushes the circuit will be closed at the next point, etc. The segments may be of the same width or extent in the peripheral direction. Some of the points on the commutator have no segments 132 so that the insulating portions are shown wider at these places. On the other hand, where two adjacent points on the commutator are provided with segments these segments may be made as one, omitting the intervening insulating portion and in such instance, the segments are shown wider than at the other points. As shown in Fig. 5 the brushes 96b and 96c are connected to each other by a wire 135. Assuming that card 1 in Fig. 10 is punched to represent the numeral 6 in the column to be analyzed by the pins 69 there disclosed, when the upper and lower pins 69 of such column take a reading as in Fig. 10 and set their commutator brushes accordingly representing the numeral "6" and when the commutators have turned through the 9, 8, and 7 positions to the 6 position the parts will be in the relative positions shown in Fig. 5. Here it will be seen that, presuming the current to be entering through the brush 96d, it will pass into the segment 132, along the connecting strip 133 to the segment 132 which is now in contact with brush 96b. From here the current passes through wire 135 to brush 96c into the segment 132, along the connecting member 134, to the segment 132 with which the brush 96a is now in contact. Thus after the brushes have been set and the commutators 97, 97a continue to rotate, when they reach the 6 position, current will pass from the line 136 (Fig. 4) through contacts 128, magnet 123, to the brush 96d, commutator 97a, brush 96b, wire 135, brush 96c to commutator 97, brush 96a, and back to the other side of the line 137.

As soon as the magnet 123 is energized the arm 121 becomes released to effect clutching of the respective accumulator pinion. At this time the spring 127 which actuates the arm 121 opens contacts 128 and the magnet 123 becomes deenergized. The particular accumulator wheel will now commence to rotate and will continue to rotate until the end of the cycle when it becomes demeshed from the driving shaft 118. The accumulator wheel will during this time turn an amount equal to the value of 6. The construction of the accumulators to effect carrying from one order to the next higher order being well known in this art is not shown in detail here.

I claim:

1. In a perforated record controlled machine, means for feeding records to the machine, a plurality of card sensing pins for analyzing a record, a separate brush associated with each pin, a commutator associated with the brushes, means controlled by the pins for adjusting the brushes with respect to the commutator and registering means controlled through said brushes and commutator.

2. In a machine of the class described, a plurality of perforation sensing pins for sensing a column of perforations, arms adapted to be actuated by said pins, means for latching the arms in moved position, a brush carried by each arm, commutator means associated with said brushes and registering means controlled through said brushes and commutator.

3. In an accounting machine, a rotatably mounted commutator, brushes associated therewith and a separate perforation sensing pin connected to each brush and adapted to move the latter along the periphery of the commutator, said brushes and commutator being adapted to control the operation of the machine.

4. In a machine of the class described, an accumulator, a rotatable commutator having brushes cooperating therewith for differentially controlling the accumulator by closing an electric circuit at a predetermined time in its cycle of operation, means for sensing data on record cards, said sensing means being adapted to cause shifting of the brushes along the periphery of the commutator for varying the time of closure of the circuit to vary the control of the accumulator.

5. In an accounting machine, a controlled device, a rotatable commutator having brushes cooperating therewith for differentially controlling said device by closing an electric circuit at a predetermined time in its cycle of operation, means for sensing data on records, said sensing means being adapted to cause shifting of the brushes along the periphery of the commutator for varying the time of closure of the circuit to vary the control of said device.

JOHN ROYDEN PEIRCE.